United States Patent [19]
d'Hont

[11] Patent Number: 5,748,137
[45] Date of Patent: May 5, 1998

[54] WIRELESS FLYWHEEL SYNCHRONIZATION METHOD

[75] Inventor: Loek d'Hont, Garland, Tex.

[73] Assignee: Texas Instruments Incorporated, Dallas, Tex.

[21] Appl. No.: 646,881

[22] Filed: May 8, 1996

[51] Int. Cl.⁶ ...................................................... G01S 13/78
[52] U.S. Cl. ........................................ 342/42; 342/44
[58] Field of Search .................... 342/42, 44, 50, 342/51, 31, 40, 46; 340/825.34, 825.54

[56] References Cited

U.S. PATENT DOCUMENTS

| | | | |
|---|---|---|---|
| 4,335,426 | 6/1982 | Maxwell et al. | 364/200 |
| 4,361,837 | 11/1982 | Malinowski et al. | 340/825.72 |
| 5,144,312 | 9/1992 | McCann | 342/42 |

*Primary Examiner*—John B. Sotomayor
*Attorney, Agent, or Firm*—Rebecca Mapstone-Lake; Richard A. Stoltz; Richard L. Donaldson

[57] ABSTRACT

The invention is an improved method and apparatus for synchronizing wireless communications utilizing a master source (10) for a transmitting a synchronizing pulse to multiple reader modules (20 and 28) each of which has an internal crystal oscillator (22 and 30). The synchronizing pulse periodically resets the interrogation cycle, the power burst and receive cycle, for all of the reader modules (20 and 28). Between pulses, the internal crystal oscillator (22 and 30) is used to run interrogation cycles, and thus functions as a "flywheel" to absorb fluctuations in the synchronizing pulse such as when a particular synchronizing pulse is missed.

14 Claims, 1 Drawing Sheet

WIRELESS FLYWHEEL SYNCHRONIZATION METHOD

BACKGROUND OF THE INVENTION

1. Field of the Invention

This invention relates to synchronizing signals from interrogation equipment, and, more particularly, a method of wireless synchronization of signals from interrogation equipment where both hard-wired and software synchronization of signals is not possible.

2. Related Art

In an interrogation/reader environment where there are multiple readers which interrogate transponders for information, interrogation signals transmitted by readers will interfere with one another when transmitted simultaneously. As a result of this interference, the intended receiving transponder may fail to respond. A commonly accepted way to solve this problem is to synchronize the reader transmissions, and thus avoid overlap thereof.

Currently, there are two known methods by which reader transmissions are synchronized: hard-wiring, and software. Under the hard-wired synchronizing method, there is one source in a system for providing a synchronizing signal. All readers in the system are hard-wired to the single source. Thus, in a manner well known in the art, all the readers are synchronized from a common source signal and avoid transmission overlap. In a common variation on this theme, one reader may be designated as the master reader and the remainder of readers are designated as slave readers. An internal oscillator is provided only in the master reader. The master reader transmits on a predetermined frequency derived from the internal oscillator. This transmission is communicated to other slave readers using a cable disposed between each slave reader and the master reader. Accordingly, in essence, the master reader serves as the source of the synchronizing signal which each of the slave readers receive, thereby avoiding the use of a separate source signal.

However, this method of synchronization is impossible to use when the reader modules are mounted on moving vehicles, or environmental conditions make hard-wiring cost-prohibitive.

The software synchronizing method is cumbersome because of delays between interrogation cycles when employed. These delays are created by the necessity for each module to listen for power bursts from other reader modules before commencing its own interrogation cycle. Accordingly, use of software synchronization reaches a finite limit of use where many readers and interrogation cycles exceed the time available, taking into account the time delays involved.

Accordingly, there is a need in the art to provide a wireless synchronization method which minimizes delay between interrogation cycles in a multiple reader environment.

SUMMARY OF THE INVENTION

It is in view of the above problems that the present invention was developed. The invention is an improved method and apparatus for synchronizing wireless communications utilizing a master source for a transmitting a synchronizing pulse to multiple reader modules each of which has an internal crystal oscillator. The synchronizing pulse periodically resets the interrogation cycle, the power burst and receive cycle, for all of the reader modules. Between pulses, the internal crystal oscillator is used to run interrogation cycles, and thus functions as a sort of "flywheel" to absorb fluctuations in the synchronizing pulse such as when a particular synchronizing pulse is missed.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
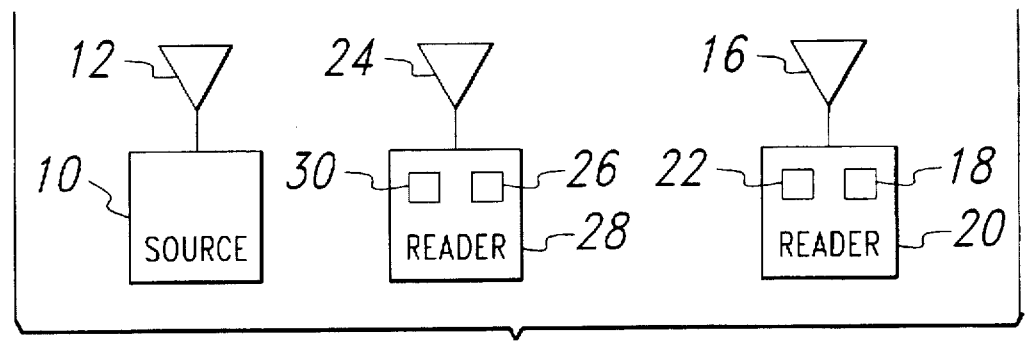
FIG. 1 illustrates the first embodiment of the present invention in which internal oscillators are used to absorb fluctuations in a synchronizing pulse.

Referring to the accompanying drawings in which like reference numbers indicate like elements, FIG. 1 illustrates an embodiment of the present invention in which master source 10 transmits a synchronizing pulse via antenna 12. The synchronizing pulse is picked up by antenna 16 and receiver 18 of first reader module 20.

Similarly, the synchronizing pulse is picked up by antenna 24 and receiver 26 of second reader module 28.

First reader module 20 and second reader module 28 are of the type disclosed in a reader-transponder system taught by U.S. Pat. No. 5,053,774 to Schuermann et al. which is hereby incorporated by reference in its entirety. As such, first reader module 20 and second reader module 28 function to interrogate transponders. However, generally, interrogation signals transmitted by readers are generally not synchronized. Accordingly, in a multiple-reader environment, interrogation signals may interfere with one another.

To solve this, crystal oscillator 22 internal to first reader module 20 and crystal oscillator 30 internal to second reader module 28 are employed to run crystal-stable interrogation cycles having fixed time intervals for the length of power-burst, as well as the length of receive. The key to providing a "flywheel" synchronization is periodic resetting or restarting the interrogation cycle in all readers simultaneously.

As an overview, master source 10 sends a synchronizing signal which is received by first reader module 20 and second reader module 28. Upon receipt of the synchronizing signal, the interrogation cycle of first reader module 20 is reset and run (or timed) by crystal oscillator 22. Similarly, the interrogation cycle of second reader module 28 is reset (or time) by crystal oscillator 30. Because first reader module 20 has a fixed time window for its interrogation cycle which does not overlap the fixed time window for the interrogation cycle of second reader module 28, a periodic synchronizing signal (or pulse) avoids a collision in the transmissions from first reader module 20 and second reader module 28.

The frequency that the synchronization pulse is transmitted is a function of the accuracy of crystal oscillators 22 and 30. For example, the accuracy of a low-cost crystal is normally between 20 to 40 pulses per million. Assuming a time-base accuracy of 40 pulses per minute as the worst case, and providing a plus or minus 1 millisecond phase-error between multiple power bursts at the end of burst moment, it will take 25 seconds from a synchronous start before the plus or minus 1 millisecond error will occur. The plus or minus 1 millisecond maximum allowable phase error is the error which occurs when a power burst signal from a reader begins to collide with a data telegram coming from a transponder that was triggered by another reader, assuming the maximum worst-case phase error of 2 milliseconds. Having concluded that a worst-case error would occur 25 seconds from a synchronous start, the frequency that the synchronization pulse is transmitted is derived from this determination. Accordingly, a synchronization pulse that resets each reader module every 5 to 10 seconds would allow any individual reader to occasionally miss a synchronization pulse and still allow enough time to avoid communication collisions. Therefore, each crystal oscillator 22 and 30 functions as a "flywheel" to absorb fluctuations in the synchronizing pulse without loss to the integrity of the entire system.

With respect to the fixed time-intervals, it is noted that first reader module 20 could be set to begin its interrogation cycle 0.1, 0.3, 0.5, 0.7, and 0.9 seconds after receiving the synchronization pulse from master source 10. Second reader module 28 could be set to begin its interrogation cycle 0.2, 0.4, 0.6, 0.8, and 1.0 seconds after receiving the synchronization pulse for master source 10. Because the readers contemplated by the Schuermann patent (and thus first reader module 20 and second reader module 28) employ a power burst lasting 50 milliseconds and a receive time period lasting 30 milliseconds, an entire interrogation cycle lasts much less than 0.1 seconds. Clearly, the fixed time intervals for the interrogation cycles may be packed much more tightly to prevent time loss between interrogation cycles inherent in synchronization systems utilizing a synchronization pulse transmitted every 0.1 seconds. In addition, the lack of dependency on receipt of a synchronization pulse by first reader module 20 and second reader module 28 for relatively long periods of time also provides a significant ability to absorb fluctuations in the synchronization pulse, such as a problem created by occasional failure to receive a synchronization pulse.

While master source 10 transmits a synchronization pulse periodically, the frequency of the pulse itself occurs at a frequency other than the operating frequency of first reader module 20 and second reader module 28. For example, if first and second reader modules 20 and 28 have an operating frequency of 134.2 kHz, a synchronizing pulse may transmit at a frequency selected from the group consisting of approximately 13 MHz, approximately 27 MHz, and approximately 40 MHz, or any other frequency other than 134.2 kHz.

Figure 2:
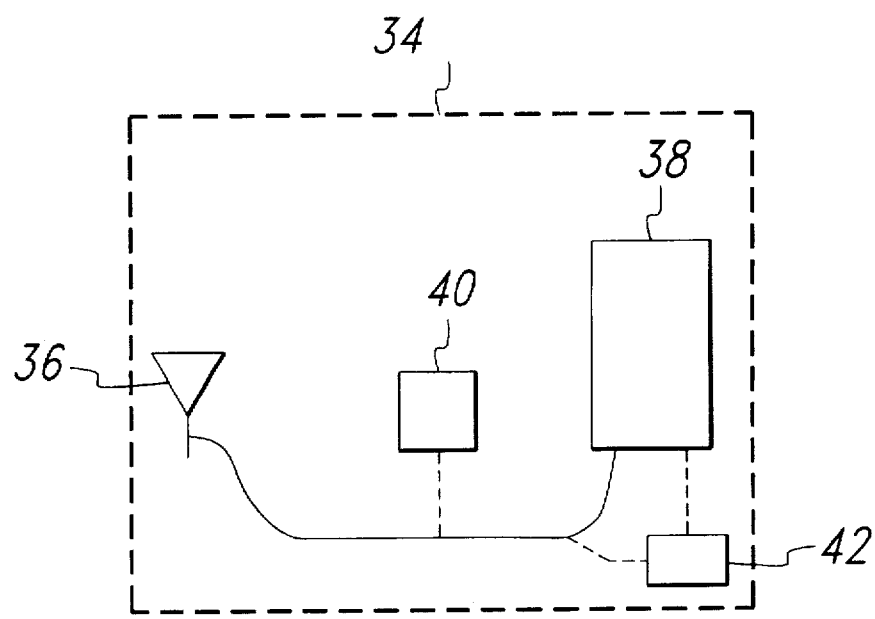
FIG. 2 illustrates in greater detail, a blocked diagram of a receiving of the present invention.

There are a variety of alternative methods in which master source 10 can transmit synchronization pulses. In one instance, master source 10 could transmit a short continuous wave (CW) pulse which would be received by first and second reader modules 20 and 28 via receivers 18 and 26. One receiver blocked diagram is shown in FIG. 2. In the event a low-cost CW receiver is necessary, receiver 34 (analogous to receivers 18 and 26) comprises a high-quality ferrite rod antenna 36 connected to AM detector 38.

As a modification of the above to prevent receiver 34 from being triggered by noise spikes, master source 10 may transmit a tone-modulated AM bursts as a synchronization pulse. In this instance, receiver 34 should also be equipped with a low frequency (LF) filter 40. Accordingly, high quality ferrite rod antenna 36 picks up the tone-modulated AM synchronization pulse from master source 10. The pulse is filtered by LF filter 40, which is a narrow active filter sensitive only to this specific tone. After filtering and eliminating erroneous triggers caused by noise, the pulse is passed to AM detector 38. Alternatively, dial tone multifrequency (DTMF) coded tones (telephone keypad tones), or digitally encoded pulses could be used within the synchronizing pulse for improved noise elimination, requiring a concomitant use of an encoder-decoder unit 42, such as a DTMF encoder-decoder or a digital encoder-decoder.

Figure 3:
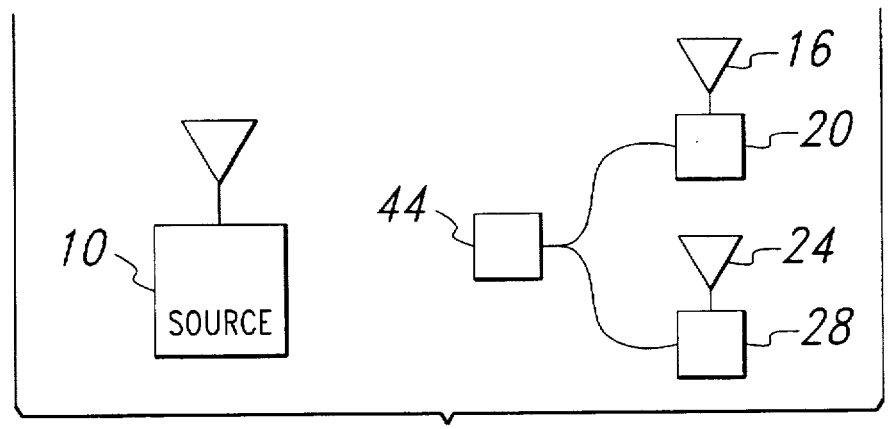
FIG. 3 illustrates an alternate embodiment of the present invention.

FIG. 3 presents an alternative embodiment of the present invention. Master source 10 transmits synchronizing pulses according to world-time standards. In other words, master source 10 could be a 19 MHz world clock operating on short-wave frequencies. In this case, a single time signal receiver 44 is employed to receive the signal from the world clock. Time signal receiver 44 is hard-wired to first reader module 20 and second reader module 28. In essence, a single time signal receiver 44 flywheel-synchronizes multiple reader modules 20 and 28, thereby combining hard-wired synchronization and wireless synchronization. While all hard-wiring is not eliminated, this embodiment still avoids the necessity of hard-wiring a path for the synchronization pulse from master source 10 to receiver 44.

In view of the foregoing, it will be seen that the several objects of the invention are achieved and other advantages are attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the fixed time intervals for an interrogation cycle may be altered to accommodate more than two reader modules. In addition, the fixed time intervals of 0.1 seconds staggered for each of first reader 20 and second reader module 28 need not be fixed or staggered in such fashion so long as the staggering of the fixed time intervals of each of the modules, respectively, do not overlap. Moreover, while an example using a synchronizing pulse transmitted periodically in a range of 5 to 10 seconds was illustrated, it should be noted that the advantage of decreased synchronization data to be transmitted is still realized even using a worst-case phase error calculation without any subsequent reduction in the pulse rate (e.g., synchronization pulse provided at least every 25 seconds, or less than 26 seconds. Finally, it should be noted that the synchronization pulse may also be varied depending upon the quality of the crystal utilized. Thus, the breadth and scope of the present invention should not be limited by any of the above-described exemplary embodiments, but should be defined only in accordance with the following claims appended hereto and their equivalents.

What is claimed is:

1. A wireless flywheel for synchronizing signal transmissions, comprising:

a master source for periodically transmitting synchronization pulses;

a first reader module having a quartz crystal and a receiver, said first module having a fixed interrogation cycle;

second reader module having a quartz crystal and a receiver, said second module having a different fixed interrogation cycle than said first module; and wherein said interrogation cycle of said first reader and said interrogation cycle of said second reader is reset upon receipt of a synchronization pulse from said master source resulting in said first reader transmitting interrogation pulses at times other than when the second reader is transmitting interrogation pulses.

2. A wireless flywheel fro synchronizing signal transmissions according to claim 1, further comprising:

a continuous wave generator connected to said master source for transmitting short bursts of continuous wave pulses.

3. A wireless flywheel for synchronizing signal transmissions according to claim 2, wherein said receiver of said first reader module further comprises a continuous wave receiver; and wherein said receiver of said second reader module further comprises a continuous wave receiver.

4. A wireless flywheel for synchronizing signal transmissions according to claim 1, wherein said receiver of said first reader module further comprises a DTMF encoder-decoder;

wherein said receiver of said second reader module further comprises a DTMF encoder-decoder; and wherein said master source transmits synchronizing pulses using DTMF coded tones.

5. A wireless flywheel for synchronizing signal transmissions according to claim 1, wherein said receiver of said first reader module further comprises a digital encoder/decoder;

wherein said receiver of said second reader module further comprises a digital encoder-decoder; and wherein said master source transmits synchronizing pulses using digitally encoded pulses.

6. A wireless flywheel for synchronizing signal transmissions according to claim 1, wherein said receiver comprises an AM receiver having a low frequency filter sensitive only to said synchronizing pulse.

7. A wireless flywheel method for synchronizing signal transmissions, comprising the steps of:

setting a plurality of fixed time intervals for an interrogation cycle for each of a plurality of reader modules relative to a crystal oscillator internal to said reader module;

transmitting a synchronizing pulse to a plurality of reader modules; and restarting the interrogation cycle upon detection of the synchronization pulse, thereby resulting in each of said plurality of reader modules transmitting interrogation pulses at different times from each other.

8. A wireless flywheel method for synchronizing signal transmissions according to 7, wherein the step of setting said plurality of reader modules with a fixed time interval for length of power-burst includes setting said fixed time interval to no less than 50 msec.

9. A wireless flywheel method for synchronizing signal transmissions according to claim 7, wherein the step of transmitting a synchronizing pulse to a plurality of reader modules with a fixed time interval for length of receive includes setting said fixed time interval to no less than 50 msec.

10. A wireless flywheel method for synchronizing signal transmissions according to claim 7, wherein the step of transmitting a synchronizing pulse to a plurality of reader modules is repeated at least every 26 seconds.

11. A wireless flywheel method for synchronizing signal transmissions according to claim 10, wherein the step of transmitting a synchronizing pulse to a plurality of reader modules is repeated at least within a range of 5 and 10 seconds.

12. A wireless flywheel method for synchronizing signal transmissions according to claim 7, wherein the step of transmitting a synchronizing pulse to a plurality of reader modules occurs at a frequency other than the operating frequency of said first reader module and said second reader module.

13. A wireless flywheel method for synchronizing signal transmissions according to claim 7, wherein the step of transmitting a synchronizing pulse to a plurality of reader modules occurs at a frequency which is selected from the group consisting of: approximately 13 MHz, approximately 27 MHz and approximately 40 MHz.

14. A wireless flywheel method for synchronizing signal transmissions according to claim 7, wherein said synchronizing pulse is a CW pulse.

* * * * *